US008680814B2

(12) United States Patent
Kabasawa et al.

(10) Patent No.: US 8,680,814 B2
(45) Date of Patent: Mar. 25, 2014

(54) BATTERY CHARGER AND BATTERY CHARGING METHOD

(75) Inventors: Takashi Kabasawa, Takasaki (JP); Hisanori Honma, Takasaki (JP)

(73) Assignee: FDK Twicell Co., Ltd., Takasaki-shi (JP)

( * ) Notice: Subject to any disclaimer, the term of this patent is extended or adjusted under 35 U.S.C. 154(b) by 282 days.

(21) Appl. No.: 13/194,753

(22) Filed: Jul. 29, 2011

(65) Prior Publication Data

US 2012/0038320 A1 Feb. 16, 2012

(30) Foreign Application Priority Data

Aug. 12, 2010 (JP) ................................ 2010-180865

(51) Int. Cl.
*H02J 7/00* (2006.01)

(52) U.S. Cl.
USPC ........... 320/126; 320/117; 320/118; 320/128; 320/132; 320/137

(58) Field of Classification Search
CPC ...................................................... H02J 7/1423
USPC .......................................................... 320/126
See application file for complete search history.

(56) References Cited

U.S. PATENT DOCUMENTS

2008/0169786 A1* 7/2008 Chang et al. .................. 320/126

FOREIGN PATENT DOCUMENTS

JP 2008-259260 * 10/2008 ................ H02J 7/02
JP 2008-259260 A 10/2008

* cited by examiner

*Primary Examiner* — Edward Tso
*Assistant Examiner* — Ahmed Omar
(74) *Attorney, Agent, or Firm* — Marshall, Gerstein & Borun LLP

(57) ABSTRACT

Charging is started with charge voltage set to a first voltage value (lower than a normal charge voltage) by a charge voltage change means, the first voltage value being predetermined to ensure that secondary batteries constituting a parallel-arrangement battery pack are charged up to and maintained at a predetermined SOC lower than full charge (between 80 and 90% of full charge). When a charge current detection means detects that charge current has decreased to a predetermined value A1, the charge voltage is set to a second voltage value (normal charge voltage) higher than the first voltage value by the charge voltage change means, the second voltage value being predetermined to enable the secondary batteries to be charged up to full charge. When a battery SOC detection means detects that at least one of the secondary batteries has reached full charge, charging is terminated.

4 Claims, 8 Drawing Sheets

CHARGING
S10 START CHARGING
S12 CHARGE CURRENT≦A1 ? — No / Yes
S14 INCREASE CHARGE VOLTAGE
S16 FULL CHARGE ? — No / Yes
S18 TERMINATE CHARGING
END

THREE SERIES
REACH FULL CHARGE
SIMULTANEOUSLY
TIME
DECREASE CHARGE CURRENT
A-SERIES
B-SERIES
C-SERIES
A-SERIES
B-SERIES
C-SERIES
HIGH
BATTERY
VOLTAGE
CHARGE
CURRENT

BATTERY CHARGER AND BATTERY CHARGING METHOD

CROSS-REFERENCE TO RELATED APPLICATION

The present application claims the benefit of priority of Japanese Application No. 2010-180865, filed Aug. 12, 2010. The entire disclosure of the priority application is incorporated herein by reference in its entirety.

FIELD OF THE INVENTION

This invention relates to a battery charger and a battery charging method, more specifically, a technique for charging a parallel-arrangement battery pack.

DESCRIPTION OF THE RELATED ART

As regards charging of a battery pack comprising a plurality of secondary batteries arranged in parallel, it is known that when one of the secondary batteries reaches full charge, charging is terminated regardless of the other secondary batteries' SOCs (states of charge)

Generally, after repetition of charge and discharge, the secondary batteries constituting a battery pack are at different SOCs. Thus, at the time when one of the secondary batteries reaches full charge, the others do not. This means that when charging is terminated, the secondary batteries have unbalanced SOCs, and that the battery pack cannot provide a predefined power.

In order to avoid unbalanced SOCs of the secondary batteries, there are conceived a technique of terminating the charging of the secondary batteries, individually, by determining whether they have reached full charge, individually, and a technique of terminating the charging after all the secondary batteries reach full charge.

Further, a technique of charging the secondary batteries, each for a fixed time is also known (see Japanese Patent Application Laid-open No. 2008-259260 Publication).

The technique of terminating the charging of the secondary batteries, individually, by determining whether they have reached full charge, individually, has however problems that charging circuits are required for individual secondary batteries, and that heating of one of the secondary batteries during charging affects the others and prevents accurate determination of whether they have reached full charge.

The technique of terminating the charging after all the secondary batteries reach full charge has a problem that a secondary battery that has reached full charge before the others becomes overcharged, and thus, deteriorates.

The technique of charging the secondary batteries, each for a fixed time has a problem that unless all the secondary batteries are at the same SOC before charging, the secondary batteries have unbalanced SOCs at the end of charging. In other words, normally, not all the secondary batteries are fully charged, and thus, the battery pack cannot exhibit full performance.

SUMMARY OF THE INVENTION

An aspect of the present invention is directed to a battery charger for charging a parallel-arrangement battery pack comprising a plurality of secondary batteries arranged in parallel, the battery charger comprising a charge parameter change means for setting and changing a charge parameter, a charge current detection means for detecting charge current, and a battery SOC detection means for detecting individual SOCs of the secondary batteries, wherein the battery charger starts charging with the charge parameter set to a first value by the charge parameter change means, the first value being predetermined to ensure that the secondary batteries are charged up to and maintained at a predetermined SOC lower than full charge, and when the charge current detection means detects that the charge current has decreased to a predetermined value, goes on charging with the charge parameter set to a second value by the charge parameter change means, the second value being predetermined to enable the secondary batteries to be charged up to full charge, and when the battery SOC detection means detects that at least one of the secondary batteries has reached full charge, terminates charging.

Another aspect of the present invention is directed to a battery charging method for charging a parallel-arrangement battery pack comprising a plurality of secondary batteries arranged in parallel, with a battery charger comprising a charge parameter change means for setting and changing a charge parameter, a charge current detection means for detecting charge current, and a battery SOC detection means for detecting individual SOCs of the secondary batteries, wherein charging is started with the charge parameter set to a first value by the charge parameter change means, the first value being predetermined to ensure that the secondary batteries are charged up to and maintained at a predetermined SOC lower than full charge, and when the charge current detection means detects that the charge current has decreased to a predetermined value, the charge parameter is set to a second value by the charge parameter change means, the second value being predetermined to enable the secondary batteries to be charged up to full charge, and when the battery SOC detection means detects that at least one of the secondary batteries has reached full charge, charging is terminated.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, embodiments of a battery charger and a battery charging method according to the present invention will be described below.

First Embodiment

Figure 1:
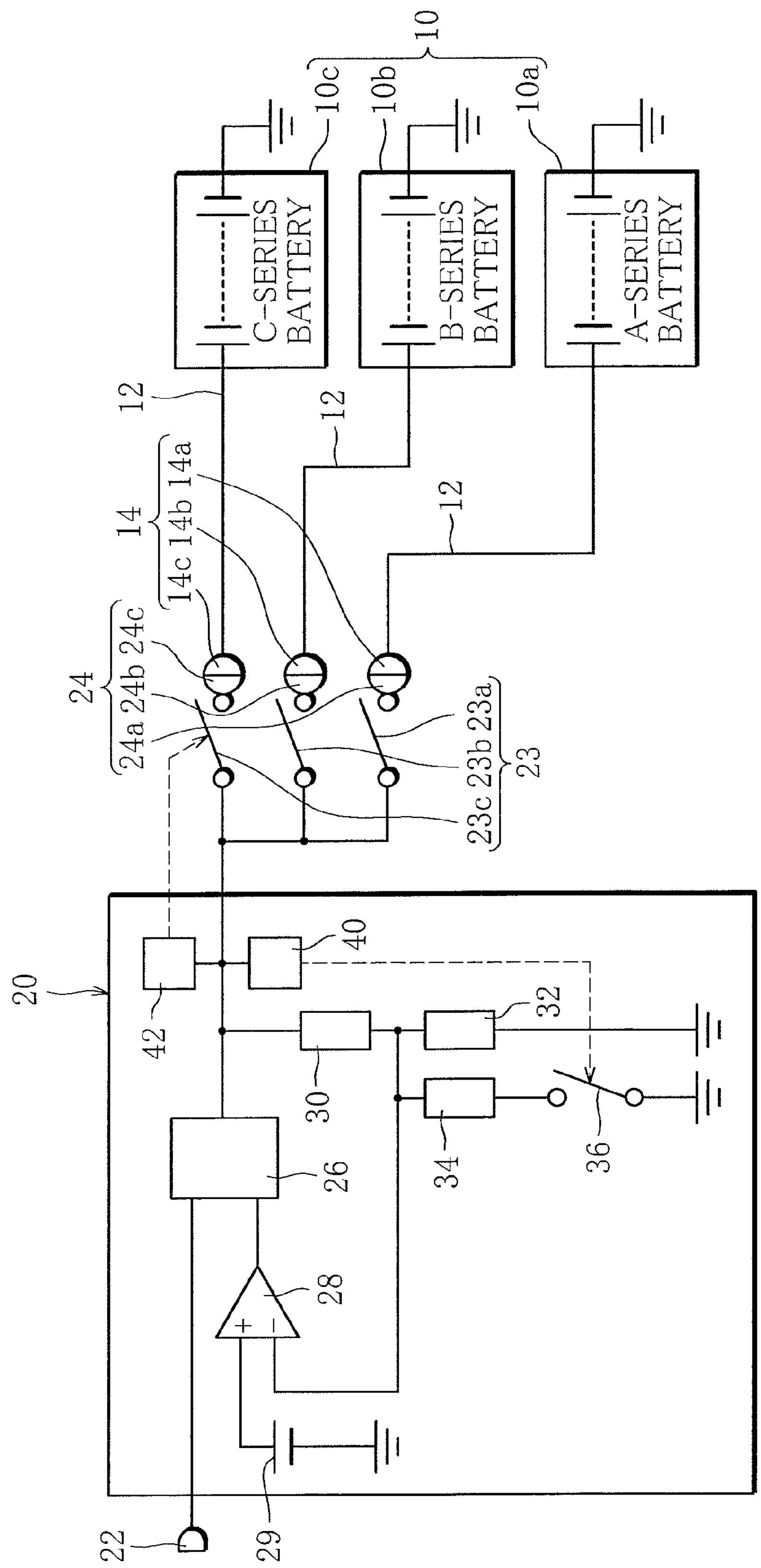
FIG. 1 is a schematic diagram showing the configuration of a first embodiment of a battery charger according to the present invention.

FIG. 1 is a schematic diagram showing the configuration of a first embodiment of a battery charger according to the present invention.

A parallel-arrangement battery pack 10 to be charged with the battery charger comprises a plurality of secondary batteries connected in parallel. FIG. 1 shows a parallel-arrangement battery pack 10 comprising three secondary batteries, i.e., an A-series battery 10*a*, a B-series battery 10*b*, and a C-series battery 10*c* connected in parallel, as an example.

Leads 12 are connected to the positive electrodes of the A-series, B-series and C-series batteries 10*a*, 10*b*, 10*c*, respectively, at one end, and to an input connector 14, at the other end. Specifically, the input connector 14 comprises input connectors 14*a*, 14*b*, 14*c* provided for the A-series, B-series and C-series batteries 10*a*, 10*b*, 10*c*, respectively. The A-series, B-series and C-series batteries 10*a*, 10*b*, 10*c* are, for example nickel-metal-hydride secondary batteries, but may be secondary batteries of another type.

The battery charger is mainly composed of a DC/DC converter 20. The DC/DC converter 20 has an input connector 22 and an output connector 24. Specifically, the output connector 24 comprises output connectors 24*a*, 24*b*, 24*c* provided for the A-series, B-series and C-series batteries 10*a*, 10*b*, 10*c*, respectively.

An input terminal of a main body 26 of the DC/DC converter 20 is connected to the input connector 22, another input terminal thereof is connected to a cell 29 with a voltage sensor 28 interposed between, and an output terminal thereof is connected to the output connector 24 with a switch 23 interposed between. Further, an output line from the DC/DC converter main body 26 is connected to earth with resistors 30, 32 interposed between, and the voltage sensor 28 is connected to the wire between the resistors 30 and 32. The wire between the resistors 30 and 32 is connected to earth with a resistor 34 and a charge voltage change switch 36 interposed between.

Further, a charge current detector 40 (charge current detection means) for detecting charge current and a battery SOC detector 42 (battery SOC detection means) for detecting the respective SOCs of the A-series, B-series and C-series batteries 10*a*, 10*b*, 10*c* are connected to the output line from the DC/DC converter main body 26.

Specifically, the switch 23 is provided to start and terminate the charging of the A-series, B-series and C-series batteries 10*a*, 10*b*, 10*c*. The switch 23 comprises switches 23*a*, 23*b*, 23*c* associated with the output connectors 24*a*, 24*b*, 24*c*, and thus, the A-series, B-series and C-series batteries 10*a*, 10*b*, 10*c*, respectively. The switches 23*a*, 23*b*, 23*c* are designed to automatically take OFF-position (open) when battery SOC information supplied from the battery SOC detector 42 tells that any of the A-series, B-series and C-series batteries 10*a*, 10*b*, 10*c* has reached full charge.

The charge voltage change switch 36 is provided to supply power at a normal charge voltage when it is in ON-position (closed) and at a voltage lower than the normal charge voltage when it is in OFF-position (open) (charge voltage change means, parameter change means). The charge voltage change switch 36 is designed to automatically take ON-position (close) when charge current information supplied from the charge current detector 40 tells that the charge current has decreased to a predetermined value or below.

The A-series, B-series and C-series batteries 10*a*, 10*b*, 10*c* are charged with the battery charger configured as described above, with an input power source connected to the input connector 22 of the DC/DC converter 20 and the input connectors 14*a*, 14*b*, 14*c* of the A-series, B-series and C-series batteries 10*a*, 10*b*, 10*c* connected to the output connectors 24*a*, 24*b*, 24*c* of the DC/DC converter 20, respectively.

Next, how the first embodiment of the battery charger, configured as described above, operates, or in other word, a first embodiment of the battery charging method will be described.

Figure 2:
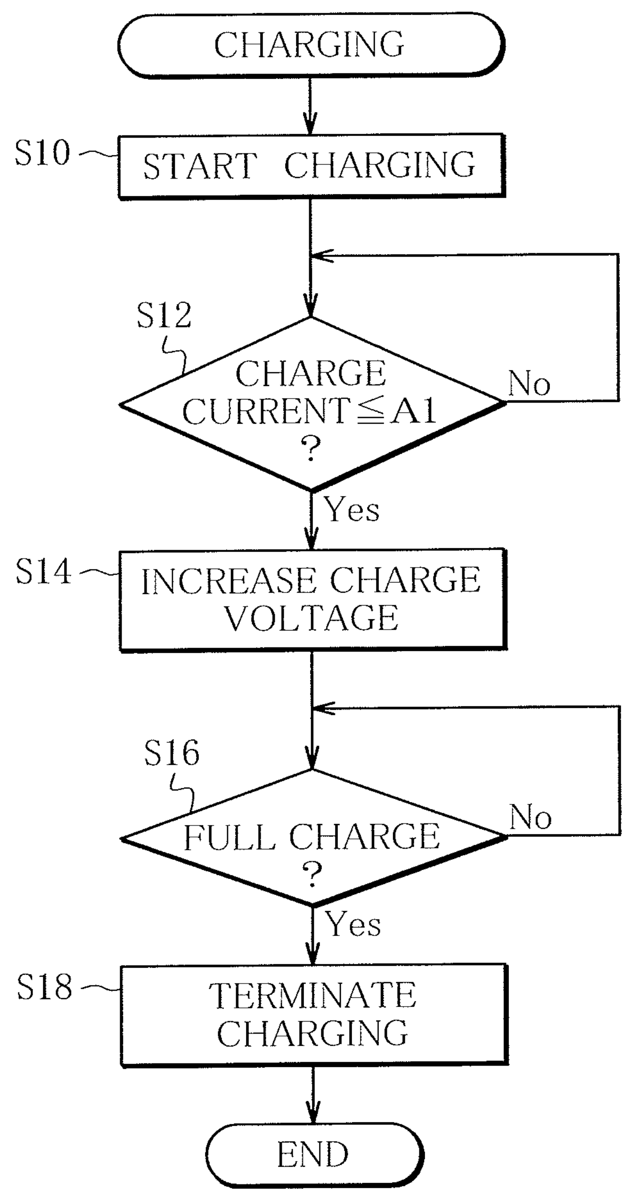
FIG. 2 is a flow chart showing an operation routine of the first embodiment of the battery charger.
Figure 3:
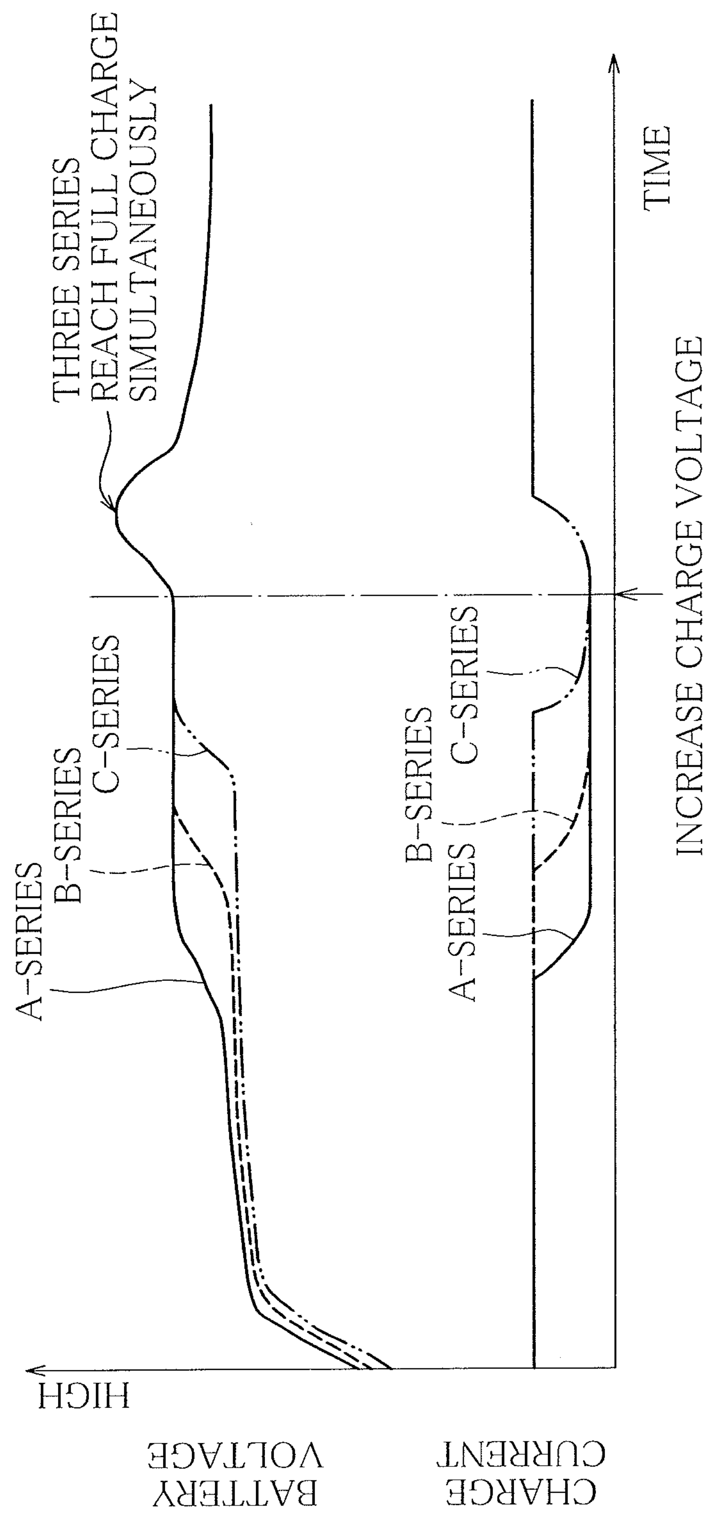
FIG. 3 is a time chart showing how battery voltage and charge current vary with time, when the operation routine shown in FIG. 2 is executed.

FIG. 2 is a flow chart showing an operation routine of the first embodiment of the battery charger. FIG. 3 is a time chart showing how battery voltage and charge current vary with time when the operation routine shown in FIG. 2 is executed. The following description will be given on the basis of the flow chart in FIG. 2 and the time chart in FIG. 3. For the explanation's sake, it is assumed that before starting charging, the SOCs of the A-series, B-series and C-series batteries 10*a*, 10*b*, 10*c* are 50%, 30%, and 10% of full charge, respectively, and thus, the A-series battery is at the highest SOC, the B-series battery at the second highest and the C-series battery at the lowest.

When charging of the A-series, B-series and C-series batteries 10*a*, 10*b*, 10*c* is required, the battery charger starts charging the batteries, simultaneously, at step S10 in FIG. 2. Specifically, the battery charger puts the switches 23*a*, 23*b*, 23*c* in ON-position (closes them), and puts the charge voltage change switch 36 in OFF-position (opens it) to supply power to the A-series, B-series and C-series batteries 10*a*, 10*b*, 10*c* at a voltage lower than a normal charge voltage (first predetermined voltage value, first predetermined value).

As seen in FIG. 3, with the battery charger with its switches set as described above, charging is started at a constant charge current (in constant current mode; abbreviated to CC mode). Then, first the battery voltage of the A-series battery 10*a* (upper solid line) begins increasing and the charge current to it (lower solid line) begins decreasing, then the battery voltage of the B-series battery 10*b* (upper broken line) begins increasing and the charge current to it (lower broken line) begins decreasing, and last the battery voltage of the C-series battery 10*c* (upper two-dot chain line) begins increasing and the charge current to it (lower two-dot chain line) begins decreasing. Charging of the A-series battery 10*a*, then the B-series battery 10*b* and then the C-series battery 10*c* thus shifts to the state that the battery is charged at a constant voltage (constant voltage mode; abbreviated to CV mode).

Figure 4:
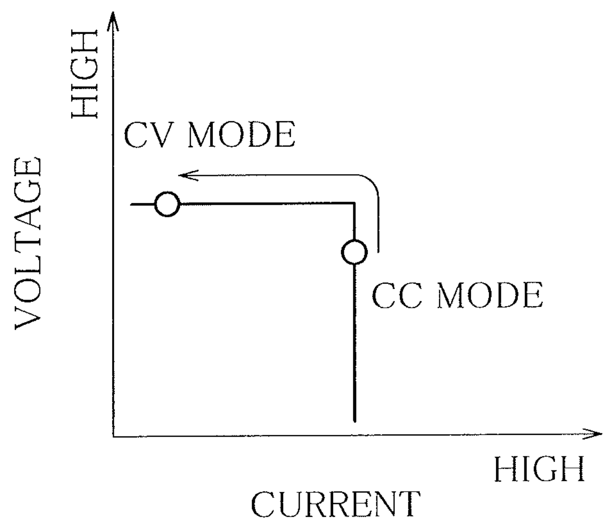
FIG. 4 is a diagram schematically showing a relationship between charge current and charge voltage (power source characteristic) observed after charging is started with the first embodiment of the battery charger.

FIG. 4 schematically shows a relationship between charge current and charge voltage observed after charging is started with the first embodiment of the battery charger. As indicated by an arrow in FIG. 4, charging of each of the A-series, B-series and C-series batteries 10*a*, 10*b*, 10*c* shifts to CV mode with a charge voltage lower than the normal charge voltage.

As seen in FIG. 4, after charging of the A-series, B-series and C-series batteries 10*a*, 10*b*, 10*c* shifts to CV mode, charge current decreases to a predetermined value A1 and the battery voltage is maintained at a predetermined value (between 80 and 90% of the maximum battery voltage). It is known that battery voltages between 80 and 90% of the maximum battery voltage generally correspond to SOCs between 80 and 90% of full charge. Thus, the battery charger's maintaining the battery voltages of the A-series, B-series and C-series batteries 10*a*, 10*b*, 10*c* at the predetermined value means that the A-series, B-series and C-series batteries 10*a*, 10*b*, 10*c* are all charged up to the same SOC (between 80 and 90% of full charge).

At step S12 in FIG. 2, the charge current detector 40 determines whether or not the charge current has decreased to the predetermined value Al or below. This means determining whether or not charging of all the A-series, B-series and C-series batteries 10*a*, 10*b*, 10*c* has shifted from CC mode to CV mode and all the A-series, B-series and C-series batteries 10*a*, 10*b*, 10*c* has reached the predetermined battery voltage and thus the predetermined SOC. If the result of determination is "No", step 12 is repeated. If the result of determination is "Yes", control flow goes to step S14.

At step S14, the battery charger increases the charge voltage. Specifically, in response to signal from the charge current detector 40, the battery charger puts the charge voltage change switch 36 in ON-position (closes it) while keeping the switches 23*a*, 23*b*, 23*c* in ON-position (closed). As a result, the charge voltage is increased to the normal charge voltage (second predetermined voltage value, second predetermined value), and charging of all the A-series, B-series and C-series batteries 10*a*, 10*b*, 10*c* shifts from CV mode to CC mode. Incidentally, the normal charge voltage is higher than the full-charge battery voltage of the A-series, B-series and C-series batteries 10*a*, 10*b*, 10*c*.

Figure 5:
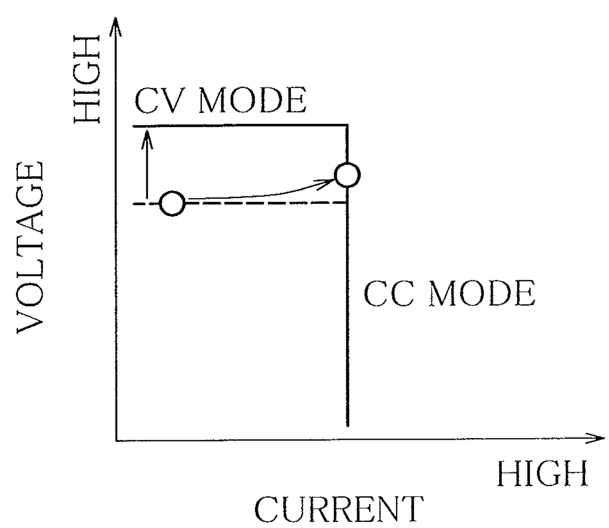
FIG. 5 is a diagram schematically showing a relationship between charge current and charge voltage (power source characteristic) observed after charge voltage is increased to a normal charge voltage in the charging with the first embodiment of the battery charger.

FIG. 5 schematically shows a relationship between charge current and charge voltage observed after the charge voltage change switch 36 is put in ON-position (opened) so that the charge voltage is increased to the normal charge voltage in the charging with the first embodiment of the battery charger. As indicating by an arrow in FIG. 5, as a result of increase of the charge voltage, charging of the A-series, B-series and C-series batteries 10*a*, 10*b*, 10*c* shifts from CV mode to CC mode so that their battery voltages further increase.

At step S16, the battery SOC detector 42 determines whether any of the A-series, B-series and C-series batteries 10*a*, 10*b*, 10*c* has reached full charge. Specifically, as shown in FIG. 3, the battery SOC detector 42 determines whether any of the battery voltages detected of the A-series, B-series and C-series batteries 10*a*, 10*b*, 10*c* has reached the full-charge battery voltage. If the result of determination is "No", the battery SOC detector 42 repeats step S16. If the result of determination is "Yes", control flow goes to step S18.

When it is determined at step S12 that the charge current has decreased to the predetermined value A1 or below, it means that the A-series, B-series and C-series batteries 10*a*, 10*b*, 10*c* are all charged up to the predetermined SOC (between 80 and 90% of full charge). Thus, when the battery charger increases the charge voltage to the normal charge voltage at step S14, all the A-series, B-series and C-series batteries 10*a*, 10*b*, 10*c* reach full charge simultaneously. Thus, if it is determined at step S16 that at least one of the A-series, B-series and C-series batteries 10*a*, 10*b*, 10*c* has reached full charge, it means that the A-series, B-series and C-series batteries 10*a*, 10*b*, 10*c* have all reached full charge.

In response to signal from the battery SOC detector 42 indicating that all the A-series, B-series and C-series batteries 10*a*, 10*b*, 10*c* have reached full charge, the battery charger puts the switches 23*a*, 23*b*, 23*c* in OFF-state (opens them), thereby terminating the charging at step S18.

In sum, the first embodiment of the battery charger and battery charging method according to the present invention is designed to charge a parallel-arrangement battery pack 10 comprising a plurality of secondary batteries, such as the aforementioned A-series, B-series and C-series batteries 10*a*, 10*b*, 10*c*, connected in parallel, by simultaneously starting to supply power to the secondary batteries at a charge voltage lower than the normal charge voltage, and when all the secondary batteries reach a predetermined battery voltage (between 80 and 90% of the maximum battery voltage), or in other words, the secondary batteries are all charged up to a predetermined SOC (between 80 and 90% of full charge), increasing the charge voltage to the normal charge voltage.

This enables all the secondary batteries constituting the parallel-arrangement battery pack 10 to reach full charge simultaneously.

Second Embodiment

Figure 6:
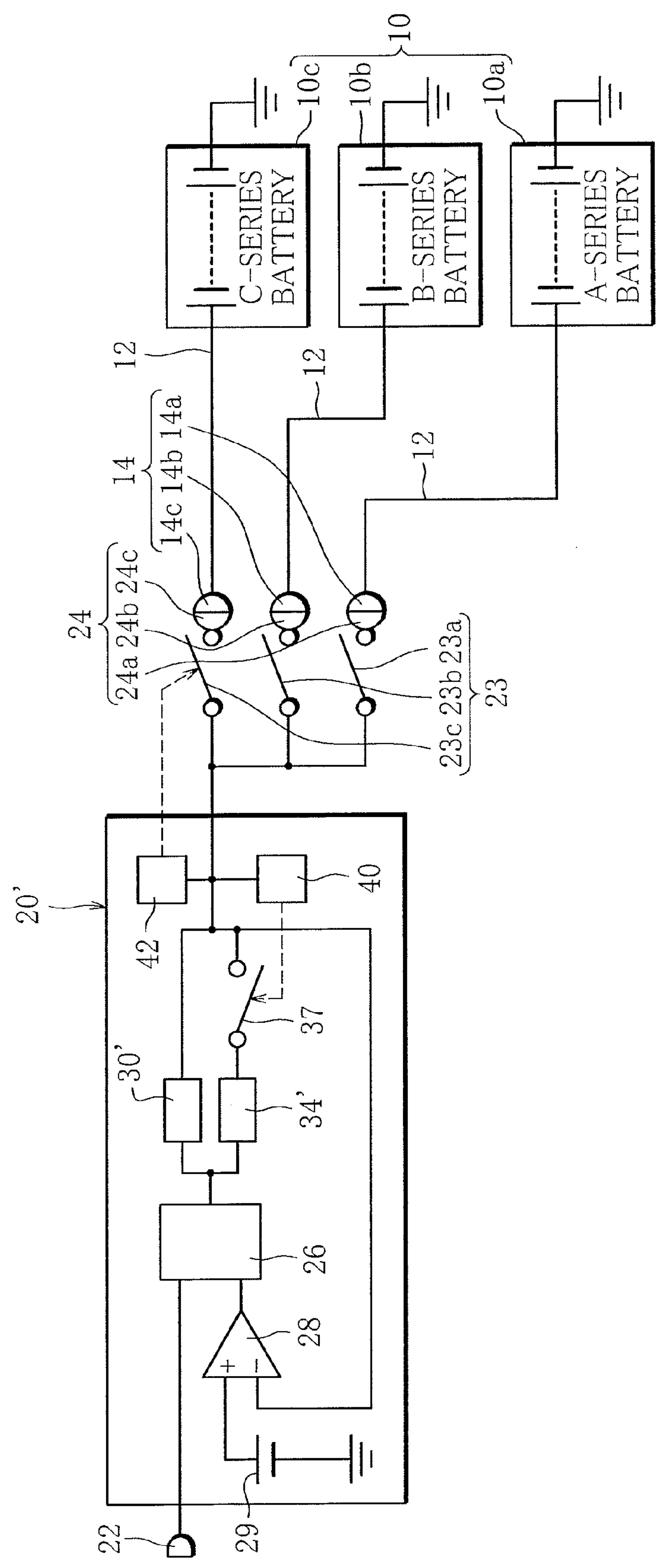
FIG. 6 is a schematic diagram showing the configuration of a second embodiment of the battery charger according to the present invention.

FIG. 6 is a schematic diagram showing the configuration of a second embodiment of the battery charger according to the present invention.

The second embodiment of the battery charger differs from the first embodiment thereof in that the former varies the charge current while the latter varies the charge voltage. The following explanation of the second embodiment will be focused on the differences from the first embodiment; the description of the features shared with the first embodiment will be omitted.

The second embodiment of the battery charger is mainly composed of a DC/DC converter 20'. An input terminal of a main body 26 of the DC/DC converter 20' is connected to an input connector 22. An output line from the DC/DC converter main body 26 is connected to a switch 23 and a voltage sensor 28 with a resistor 30' interposed between. Further, a resistor 34' and a charge current change switch 37 are connected to the output line from the DC/DC converter main body 26, in parallel with the resistor 30'.

The charge current change switch 37 is put in ON-position (closed) to supply power at a charge current higher than a normal charge current, and in OFF-position (opened) to supply power at the normal charge current (charge current change means, parameter change means). The charge current change switch 37 is designed to automatically take OFF-position (open) when charge current information supplied from a charge current detector 40 tells that the charge current has decreased to a predetermined value or below.

Next, how the second embodiment of the battery charger, configured as described above, operates, or in other word, a second embodiment of the charging method will be described.

Figure 7:
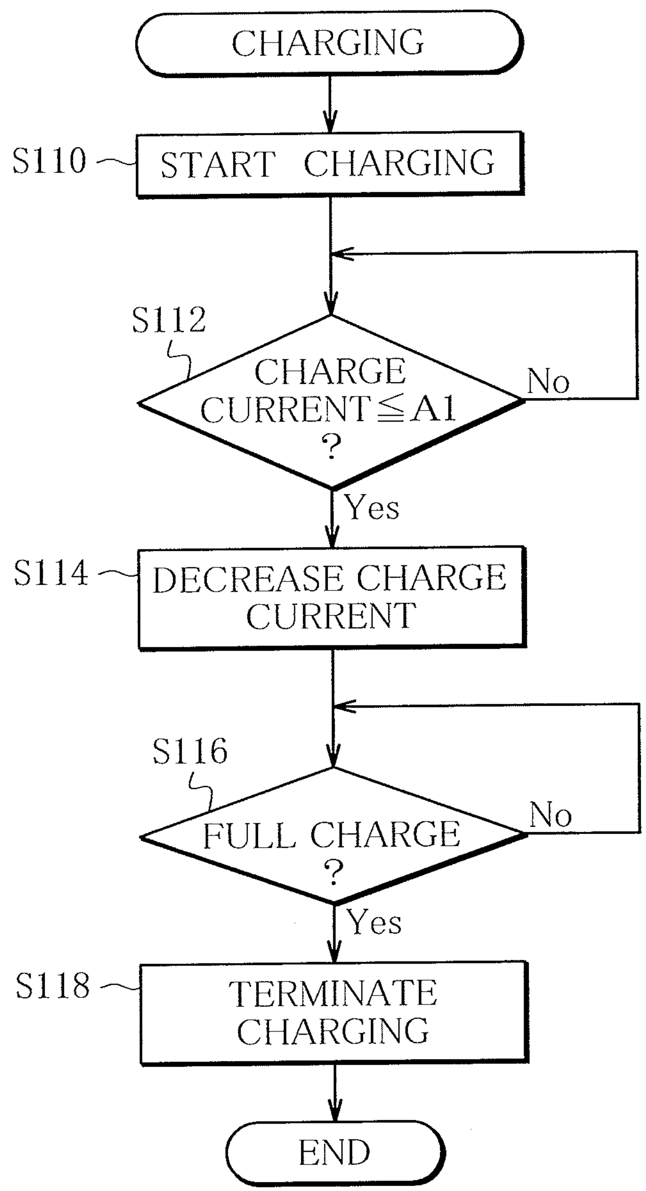
FIG. 7 is a flow chart showing an operation routine of the second embodiment of the battery charger.
Figure 8:
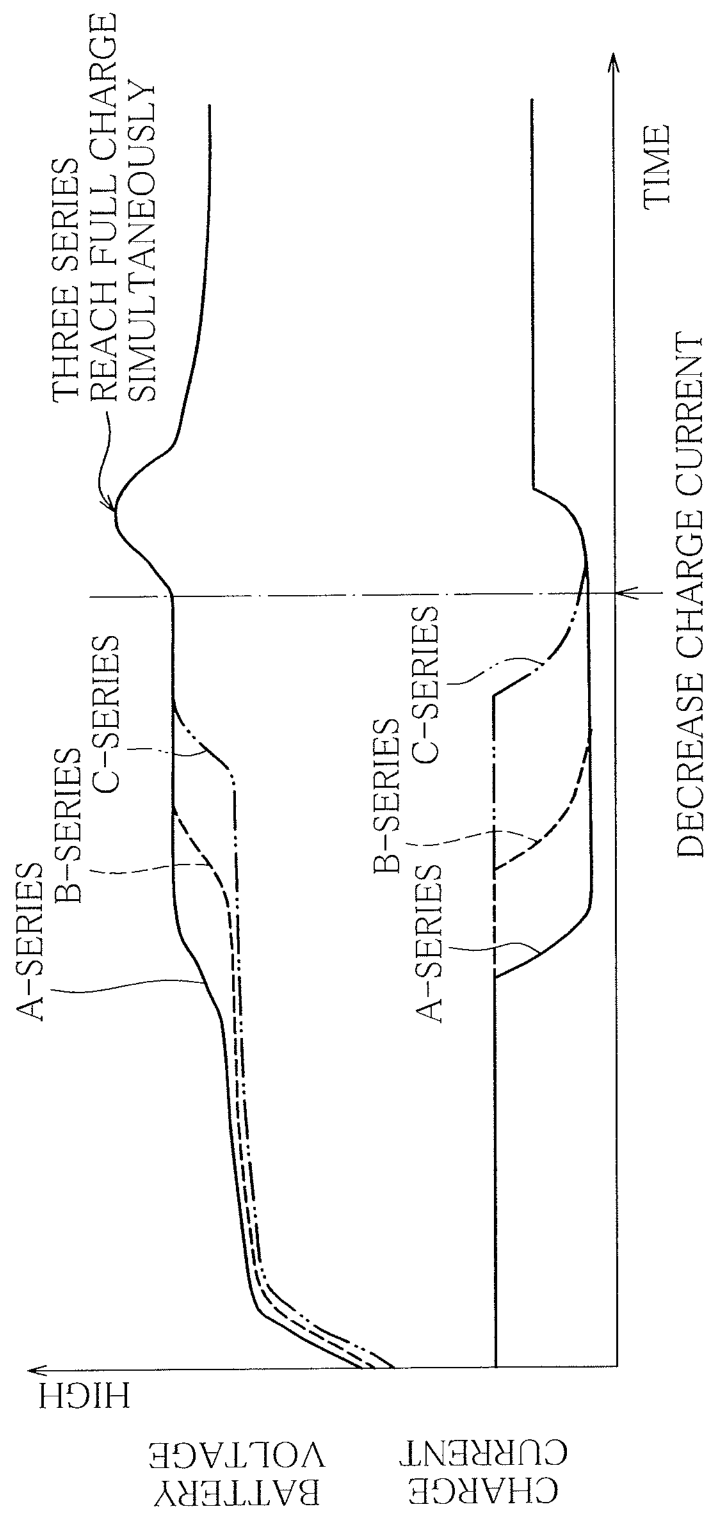
FIG. 8 is a time chart showing how battery voltage and charge current vary with time, when the operation routine shown in FIG. 7 is executed.

FIG. 7 is a flow chart showing an operation routine of the second embodiment of the battery charger. FIG. 8 is a time chart showing how battery voltage and charge current vary with time when the operation routine shown in FIG. 7 is executed. The following description will be given on the basis of the flow chart in FIG. 7 and the time chart in FIG. 8. For the explanation's sake, it is assumed, as in the explanation of the first embodiment, that before starting charging, the SOCs of the A-series, B-series and C-series batteries 10*a*, 10*b*, 10*c* are 50%, 30%, and 10% of full charge, respectively, and thus, the A-series battery is at the highest SOC, the B-series battery at the second highest and the C-series battery at the lowest.

When charging of the A-series, B-series and C-series batteries 10*a*, 10*b*, 10*c* is required, the battery charger starts charging the batteries, simultaneously, at step S110 in FIG. 7. Specifically, the battery charger puts the switches 23*a*, 23*b*, 23*c* in ON-position (closes them), and puts the charge current change switch 37 in ON-position (closes it) to supply power to the A-series, B-series and C-series batteries 10*a*, 10*b*, 10*c* at a current higher than a normal charge current (first predetermined current value, first predetermined value).

As seen in FIG. 8, with the battery charger with its switches set as described above, charging is started at a constant charge current (in CC mode), as in the case of the first embodiment. Then, first the battery voltage of the A-series battery 10*a* (upper solid line) begins increasing and the charge current to it (lower solid line) begins decreasing, then the battery voltage of the B-series battery 10*b* (upper broken line) begins increasing and the charge current to it (lower broken line) begins decreasing, and last the battery voltage of the C-series battery 10*c* (upper two-dot chain line) begins increasing and the charge current to it (lower two-dot chain line) begins decreasing. Charging of the A-series battery 10*a*, then the B-series battery 10*b* and then the C-series battery 10*c* thus shifts to the state that the battery is charged at a constant voltage (CV mode).

Figure 9:
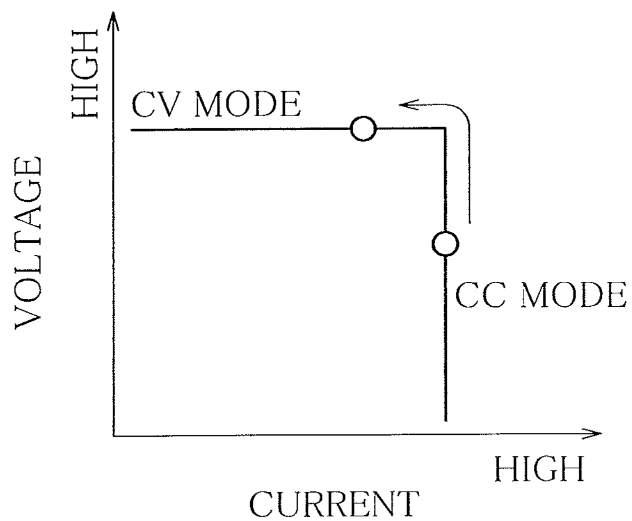
FIG. 9 is a diagram schematically showing a relationship between charge current and charge voltage (power source characteristic) observed after charging is started with the second embodiment of the battery charger.

FIG. 9 schematically shows a relationship between charge current and charge voltage (power source characteristic) observed after charging is started with the second embodiment of the battery charger. As indicated by an arrow in FIG. 9, charging of each of the A-series, B-series and C-series batteries 10*a*, 10*b*, 10*c* is conducted at a current higher than the normal charge current and shifts to CV mode.

As seen in FIG. 9, after charging of the A-series, B-series and C-series batteries 10*a*, 10*b*, 10*c* shifts to CV mode, charge current decreases to a predetermined value A1 and the battery voltage is maintained at a predetermined value (between 80 and 90% of the maximum battery voltage). This means that the A-series, B-series and C-series batteries 10*a*, 10*b*, 10*c* are all charged up to the same SOC (between 80 and 90% of full charge).

At step S112 in FIG. 7, the charge current detector 40 determines whether or not the charge current has decreased to the predetermined value A1 or below. This means determining whether or not charging of all the A-series, B-series and C-series batteries 10*a*, 10*b*, 10*c* has shifted from CC mode to CV mode and all the A-series, B-series and C-series batteries 10*a*, 10*b*, 10*c* have reached the predetermined battery voltage and thus the predetermined SOC. If the result of determination is "No", step 112 is repeated. If the result of determination is "Yes", control flow goes to step S114.

At step S114, the battery charger decreases the charge current to the normal charge current (second predetermined current value, second predetermined value). Specifically, in response to signal from the charge current detector 40, the battery charger puts the charge current change switch 37 in OFF-position (opens it) while keeping the switches 23*a*, 23*b*, 23*c* in ON-position (closed). As a result, charging of all the A-series, B-series and C-series batteries 10*a*, 10*b*, 10*c* shifts from CV mode to CC mode.

Figure 10:
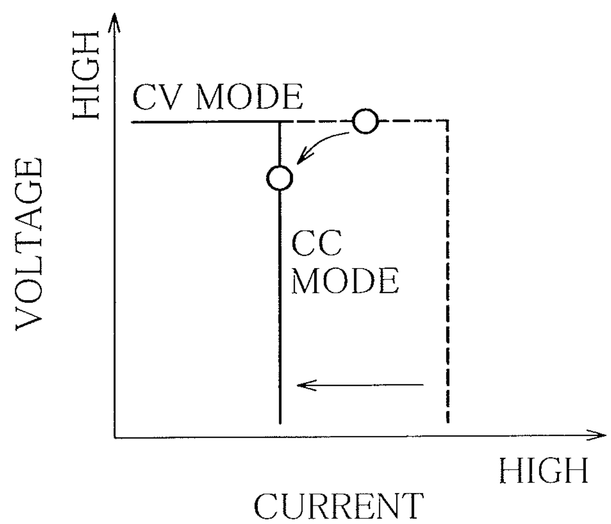
FIG. 10 is a diagram schematically showing a relationship between charge current and charge voltage (power source characteristic) observed after charge current is decreased to a normal charge current in the charging with the second embodiment of the battery charger.

FIG. 10 schematically shows a relationship between charge current and charge voltage (power source characteristic) observed after the charge current change switch 37 is put in OFF-position (opened) so that the charge current is decreased to the normal charge current in the charging with the second embodiment of the battery charger. As indicating by an arrow in FIG. 10, as a result of decrease of the charge current, charging of the A-series, B-series and C-series batteries 10*a*, 10*b*, 10*c* shifts from CV mode to CC mode so that their battery voltages further increase.

At step S116, the battery SOC detector 42 determines whether any of the A-series, B-series and C-series batteries 10*a*, 10*b*, 10*c* has reached full charge. Specifically, as shown in FIG. 8, the battery SOC detector 42 determines whether any of the battery voltages detected of the A-series, B-series and C-series batteries 10*a*, 10*b*, 10*c* has reached the full-charge battery voltage. If the result of determination is "No", the battery SOC detector 42 repeats step S116. If the result of determination is "Yes", control flow goes to step S118, where in response to signal from the battery SOC detector 42, the switches 23*a*, 23*b* and 23*c* are put in OFF-position (opened) to terminate charging.

When it is determined at step S112 that the charge current has decreased to the predetermined value A1 or below, it means that the A-series, B-series and C-series batteries 10*a*, 10*b*, 10*c* are all charged up to the predetermined SOC (between 80 and 90% of full charge). Thus, when the battery charger decreases the charge current to the normal charge current at step S114, all the A-series, B-series and C-series batteries 10*a*, 10*b*, 10*c* reach full charge simultaneously. Thus, if it is determined at step S116 that at least one of the A-series, B-series and C-series batteries 10*a*, 10*b*, 10*c* has reached full charge, it means that the A-series, B-series and C-series batteries 10*a*, 10*b*, 10*c* have all reached full charge.

In sum, the second embodiment of the battery charger and battery charging method according to the present invention is designed to charge a parallel-arrangement battery pack 10 comprising a plurality of secondary batteries, such as the aforementioned A-series, B-series and C-series batteries 10*a*, 10*b*, 10*c*, connected in parallel, by simultaneously starting to supply power to the secondary batteries at a charge current higher than the normal charge current, and when all the secondary batteries reach a predetermined battery voltage (between 80 and 90% of the maximum battery voltage), or in other words, the secondary batteries are all charged up to a predetermined SOC (between 80 and 90% of full charge), decreasing the charge current to the normal charge current.

This enables all the secondary batteries constituting the parallel-arrangement battery pack 10 to reach full charge simultaneously, as is the case with the first embodiment.

Thus, with a simple configuration, the battery charger and battery charging method according to the present invention can prevent the secondary batteries constituting a parallel-arrangement battery pack from being charged to unbalanced SOCs, even if they are at different SOCs before charging; the battery charger and battery charging method according to the present invention can continue charging in a balanced manner until all the secondary batteries reach full charge.

In the above, the battery charger and battery charging method according to the present invention has been described. The present invention is however not restricted to the described embodiments.

For example, the embodiments have been explained using an example in which the parallel-arrangement battery pack 10 to be charged comprises three secondary batteries, or A-series, B-series and C-series batteries 10*a*, 10*b*, 10*c* connected in parallel. The number of secondary batteries constituting the parallel-arrangement battery pack 10 is however not restricted to three; the parallel-arrangement battery pack may comprise any number (greater than one) of secondary batteries. No matter how many secondary batteries the parallel-arrangement battery pack comprises, the present invention has the effect described above.

What is claimed is:

1. A battery charger for charging a parallel-arrangement battery pack comprising a plurality of secondary batteries arranged in parallel, comprising:

a charge parameter change means for setting and changing a charge parameter, a charge current detection means for detecting charge current, and a battery SOC detection means for detecting individual SOCs of the secondary batteries, wherein the battery charger starts charging with the charge parameter set to a first value by the charge parameter change means, the first value being predetermined to ensure that the secondary batteries are charged up to and maintained at a predetermined SOC lower than full charge, and when the charge current detection means detects that the charge current has decreased to a predetermined value, goes on charging with the charge parameter set to a second value by the charge parameter change means, the second value being predetermined to enable the secondary batteries to be charged up to full charge, and when the battery SOC detection means detects that at least one of the secondary batteries has reached full charge, terminates charging.

2. The battery charger according to claim 1, wherein the charge parameter is charge voltage and the charge parameter change means is a charge voltage change means for setting and changing the charge voltage, wherein the battery charger starts charging with the charge voltage set to a first voltage value by the charge voltage change means, the first voltage value being predetermined to ensure that the secondary batteries are charged up to and maintained at a predetermined SOC lower than full charge, and when the charge current detection means detects that the charge current has decreased to a predetermined value, goes on charging with the charge voltage set to a second voltage value higher than the first voltage value by the charge voltage change means, the second voltage value being predetermined to enable the secondary batteries to be charged up to full charge, and when the battery SOC detection means detects that at least one of the secondary batteries has reached full charge, terminates charging.

3. The battery charger according to claim 1, wherein the charge parameter is charge current and the charge parameter change means is a charge current change means for setting and changing the charge current, wherein the battery charger starts charging with the charge current set to a first current value by the charge current change means, the first current value being predetermined to ensure that the secondary batteries are charged up to and maintained at a predetermined SOC lower than full charge, and when the charge current detection means detects that the charge current has decreased to a predetermined value, goes on charging with the charge current set to a second current value lower than the first current value by the charge current change means, the second current value being predetermined to enable the secondary batteries to be charged up to full charge, and when the battery SOC detection means detects that at least one of the secondary batteries has reached full charge, terminates charging.

4. A battery charging method for charging a parallel-arrangement battery pack comprising a plurality of secondary batteries arranged in parallel, with a battery charger comprising a charge parameter change means for setting and changing a charge parameter, a charge current detection means for detecting charge current, and a battery SOC detection means for detecting individual SOCs of the secondary batteries, wherein charging is started with the charge parameter set to a first value by the charge parameter change means, the first value being predetermined to ensure that the secondary batteries are charged up to and maintained at a predetermined SOC lower than full charge, and when the charge current detection means detects that the charge current has decreased to a predetermined value, the charge parameter is set to a second value by the charge parameter change means, the second value being predetermined to enable the secondary batteries to be charged up to full charge, and when the battery SOC detection means detects that at least one of the secondary batteries has reached full charge, charging is terminated.

* * * * *